United States Patent [19]

Otani et al.

[11] Patent Number: 4,962,400
[45] Date of Patent: Oct. 9, 1990

[54] ZOOMING CONTROL DEVICE FOR CAMERA

[75] Inventors: Tadashi Otani, Tokyo; Hiroshi Meguro, Kawasaki; Toru Kosaka, Zama, all of Japan

[73] Assignee: Nikon Corporation, Tokyo, Japan

[21] Appl. No.: 326,684

[22] Filed: Mar. 21, 1989

[30] Foreign Application Priority Data

Mar. 26, 1988 [JP] Japan .................. 63-72623

[51] Int. Cl.⁵ .............................. G03B 1/18
[52] U.S. Cl. ..................... 354/195.1; 354/195.13; 354/476; 354/432; 354/403
[58] Field of Search ............. 354/410, 195.11, 403, 354/195.12, 195.13, 409, 429, 430, 432, 402, 429, 476

[56] References Cited

U.S. PATENT DOCUMENTS

| | | | |
|---|---|---|---|
| 4,011,571 | 3/1977 | Okuzawa | 354/195.13 |
| 4,145,732 | 3/1979 | Pandres, Jr. | 364/109 |
| 4,156,933 | 5/1979 | Pandres, Jr. | 364/109 |
| 4,652,104 | 3/1987 | Harvey | 354/106 |

FOREIGN PATENT DOCUMENTS 63-40111  2/1988  Japan .

Primary Examiner—Michael L. Gellner
Assistant Examiner—Cassandra C. Spyrou
Attorney, Agent, or Firm—Shapiro and Shapiro

[57] ABSTRACT

There is disclosed a zooming control device for a camera, enabling photographing with a constant magnification of an object, and still avoiding overflowing of an object from the photographed frame in zooming of the lens. The frame is divided into plural areas, and there is discriminated whether an object is present only in the central area, or also in the peripheral area or areas. In the former case the lens is zoomed to achieve a preset image magnification, but, in the latter case, the zooming is limited in order to avoid overflowing of an object from the frame.

8 Claims, 6 Drawing Sheets

ZOOMING CONTROL DEVICE FOR CAMERA

BACKGROUND OF THE INVENTION

1. Field of the Invention

The present invention relates to a zooming control device for a camera.

2. Related Background Art

There are already known cameras in which a zoom lens is electrically driven to a desired focal length by the manipulation of an operating member.

Also among such zooming cameras there are already proposed cameras capable of so-called photographing with constant magnification, for photographing the object with a constant image size regardless of the object distance by the manipulation of a corresponding button, as disclosed for example in the U.S. Pat. Nos. 4,145,732 and 4,156,933.

In one such camera capable of photographing with constant magnification as disclosed in the Japanese Laid-open Patent No. 63-40111, data are stored in advance regarding the focal length of the photographing lens corresponding to different object distances. A focal length is determined from the stored data, corresponding to the object distance obtained in a distance measuring device of the camera, and the photographing lens is automatically driven to that focal length. The photographing with constant magnification is achieved if the stored data are so formed that the ratio of the object distance to the focal length, or the photographing magnification, is constant. It is also possible to selectively maintain the image of the upper of half of an object person or the entire body of the person at a constant size, by having two sets of such data.

However, in case of photographing laterally aligned plural persons with such a camera, if the photographing with constant magnification is conducted after a photographing field is so selected as to accommodate all the object persons, the persons in the peripheral area may be excluded from the photographing field in zooming.

SUMMARY OF THE INVENTION

An object of the present invention is to provide a camera capable of automatically setting the focal length or the photographing magnification in such a manner that the object is not excluded from the photographing field.

The present invention is applicable to a zooming control device, for use in a camera in which a zoom lens is driven to predetermined focal lengths, and features detecting means for detecting whether an object is present at different positions in an object area, discriminating means for discriminating, based on the results of said detection, whether an image of an object will be within a photographing frame at a planned photographing focal length, and focal length setting means, responsive to the discriminating means, for setting the planned focal length if the image will be within the photographing frame at the planned focal length, and, if not, for setting a different focal length so that the image will be within the photographing frame at the different focal length.

The present invention is also applicable to so-called pseudo zooming for obtaining a similar effect in printing a photograph from a developed film by enlarging a specified portion of the frame of the film instead of printing the entire frame, as disclosed for example in the U.S. Pat. No. 4,652,104. Consequently the term zooming used in the present invention shall include such pseudo zooming.

In the application of the present invention to such pseudo zooming, the driving of the zoom lens corresponds to the attaching of a trimming mark on the film for specifying the area to be subjected to the enlarged printing. Consequently the operability of the camera is improved as the exclusion of the main object from the photographing frame can be avoided without manual zooming of the operator, and the photographing with constant magnification can be achieved even when the object consists of plural persons.

DESCRIPTION OF THE PREFERRED EMBODIMENTS

Now the present invention will be clarified by detailed description of an embodiment thereof shown in the attached drawings.

Figure 1:
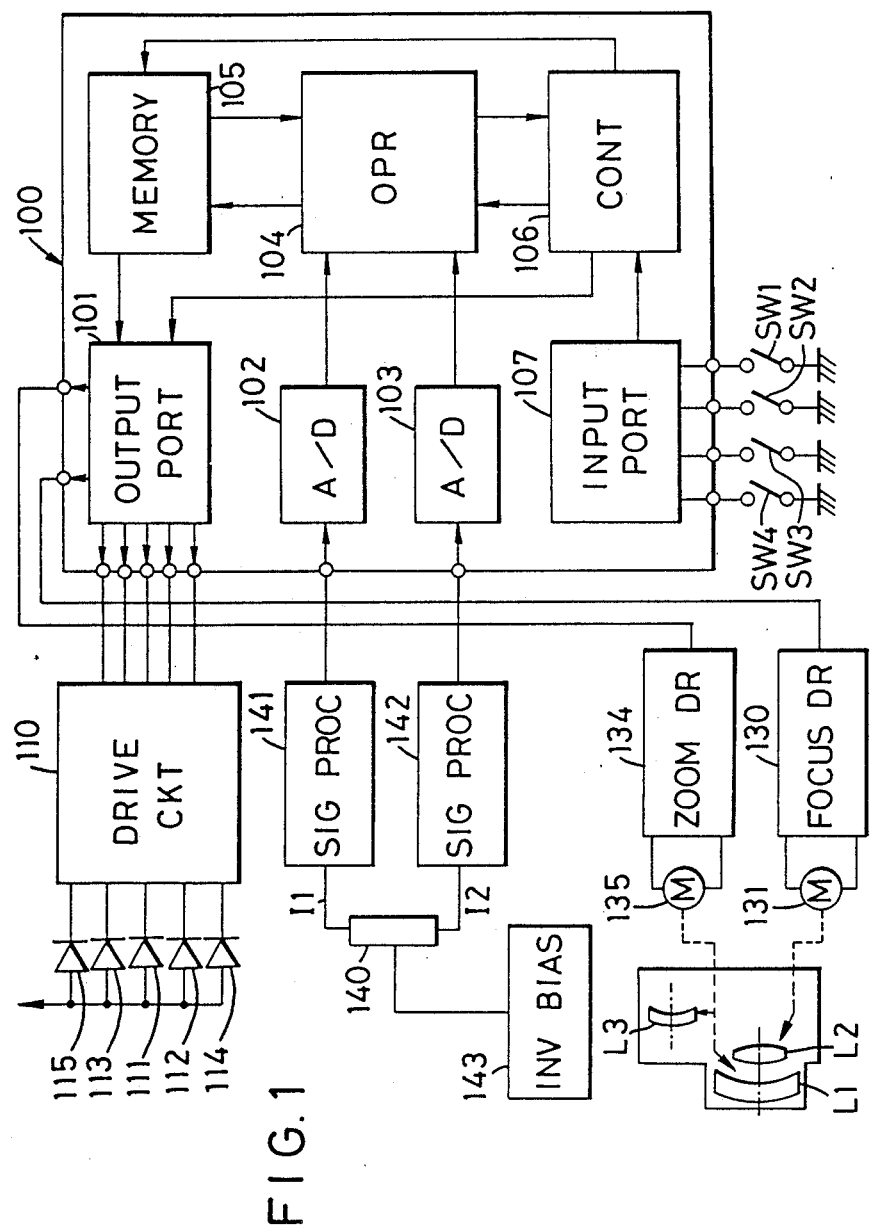
FIG. 1 is a block diagram showing the entire structure of an embodiment of the present invention.

Referring to a block diagram of the entire structure shown in FIG. 1, a CPU 100 is composed of an output port 101, A/D converters 102, 103, an operation unit 104, a memory 105, a controller 106 and an input port 107. The output port 101 is connected to a drive circuit 110 for driving five infrared light emitting elements 111 - 115 connected thereto, the drive circuit 110 activates the light emitting elements 111–115 in response to instruction signals from the output port 101.

The output port 101 is also connected to a drive circuit 130 for driving a focusing motor 131, and another drive circuit 134 for driving a zooming motor 135. The focusing motor driving circuit 130 drives focusing lens (not shown) to an in-focus position by means of the motor 131, in response to a focusing instruction signal from the CPU. The zooming motor driving circuit 134 effects zooming by moving a first zooming lens group L1 and a second zooming lens group L2 by means of the motor 135, in response to a zooming instruction signal from the CPU. A finder lens L3 in a view finder is moved in response to zooming, whereby the operator can view the object with a field corresponding to the focal length of the photographing lens.

The A/D converters 102, 103 are connected to a light receiving element 140 for receiving light reflected by the object, through respective signal processing circuits 141, 142, each of which is composed of a circuit for converting photocurrent into a voltage, a band pass filter circuit, an amplifier circuit, a rectifier circuit and an integration circuit. The light receiving element 140 is given an inverse bias voltage by an inverse bias generating circuit 143.

The input port 107 is connected to switches SW1-SW4. The switches SW1 and SW2 are closed in relation to the actuation of a shutter release button (not shown), when the release button is depressed over a first stroke respectively and a second stroke. In response to the closing of switch SW1, the CPU sends an instruction signal to the drive circuit 110 to initiate a distance measuring operation to be explained later, and sends the zooming instruction signal to the zooming motor drive circuit 134. When the switch SW2 is subsequently closed, the CPU sends the focusing instruction signal to the focusing motor drive circuit 130 according to the result of distance measurement, and effects the photographing operation by driving a shutter, a diaphragm etc. not illustrated in the drawing.

The switch SW3 is closed in response to the actuation of an automatic focal length setting button (not shown). While the switch SW3 is closed, the CPU automatically sets the focal length, in response to the closing of the switch SW1, in such a manner that the image of the not excluded from the photographing frame, as will be explained later.

The switch SW4 is closed in response to the actuation of a constant magnification photographing button (not shown). When the switch SW4 is closed, the CPU sets a constant magnification photographing mode, in which the photographing operation is conducted with a predetermined magnification. regardless of the distance to the object. The Magnification is selected from predetermined plural values, for example by the number of actuations of a magnification setting button. Also the CPU executes a photographing operation with a constant magnification as will be explained later if the switch SW3 is closed while the constant magnification photographing mode is selected.

Figure 2:
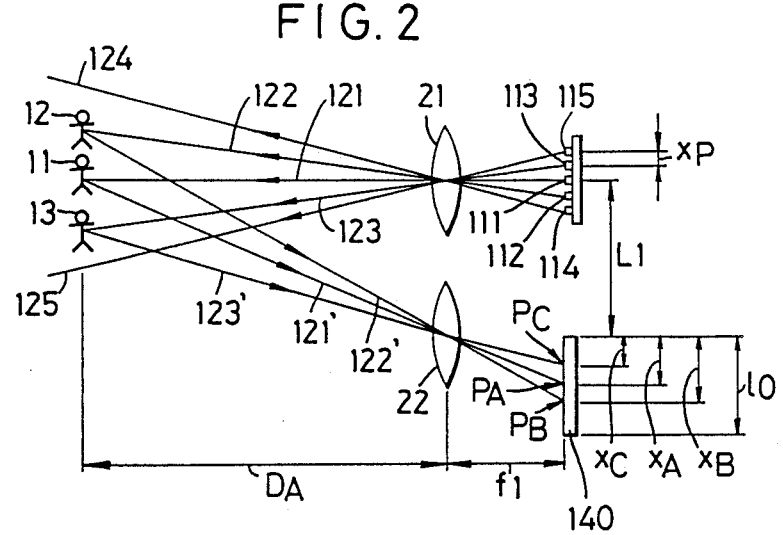
FIG. 2 is an optical path diagram for explaining the distance measuring operation.

Now reference is made to FIG. 2 for explaining the distance measuring method employed in the present embodiment.

In response to the closing of the switch SW1, the CPU sends an instruction signal to the output port 101 thereby causing the drive circuit 110 to at first activate the light emitting element 111 in the center. The emitted light 121 is projected onto the object 11 through an objective lens 21, and the reflected light 121' is received, through a light receiving lens 22, at a point $P_A$ on the light receiving element 140. The energy of thus received reflected light 121' is converted by the light receiving element 140 into photocurrents $I_1$, $I_2$, which are processed in signal processing circuits 141, 142 and converted into digital signals by the A/D converters 102, 103 in the CPU. The digital signals corresponding to the photocurrents $I_1$, $I_2$ are supplied to the operation unit 100 for calculating the object distance $D_A$ in the following manner.

The above-mentioned photocurrents $I_1$, $I_2$, can be represented by:

$$I_1 = I_0(l_0 - x_A)/l_0 \tag{1}$$

$$I_2 = I_0 \cdot x_A/l_0 \tag{2}$$

wherein $l_0$ is the total length of the light receiving element 140, and $x_A$ A is the distance from an end thereof to the point $P_A$, as shown in FIG. 2. Taking P as:

$$P = (I_1 - I_2)/(I_1 + I_2) \tag{3}$$

there is obtained from the foregoing:

$$P = 1 - 2x_A/l_0 \tag{4}$$

By substituting the P determined in the equation (3) into the equation (4). the distance $x_A$ can be determined as the function of $I_1$ and $I_2$. Consequently the distance $D_A$ to the object 11 can be represented as:

$$D_A = f_1 \cdot L_1/x_A \tag{5}$$

wherein $f_1$ is the distance between the light receiving lens 22 and the light receiving element 140, and $L_1$ is the distance between the light emitting element 111 and an end of the light receiving element 140. The operator 100 determines the object distance $D_A$ according to the equation (5) and stores the result in the memory 105.

After the light emission of the central light emitting element 111, the CPU activates other elements 112–115 in succession. The light beams 122, 123 from the inner elements 112, 113 are respectively reflected by objects 12, 13, and the reflected light beams 122', 123' are received, through the light receiving lens 22, respectively at points $P_B$, $P_C$ on the light receiving element 140. The optical energy of these light beam is converted into photocurrents $I_1$, $I_2$ as explained above, then processed in the signal processing circuits 141, 142, digitized in the A/D converters 102, 103 and supplied to the operator 100.

The distances $D_B$, $D_C$ to the objects 12, 13 are given by:

$$D_B = f_1 \cdot L_1/(x_B - X_P) \tag{6}$$

$$D_C = f_1 \cdot L_1/(x_C + x_p) \tag{7}$$

wherein $x_p$ is the distance between the light emitting elements, and $x_B$, $x_C$ are distances of the points $P_B P_C$ from an end of the light receiving element 140. The operator 100 determines the object distances $D_B$. $D_C$ according to these equations. Also the CPU activates the light emitting elements 114, 115 at the ends and the operator 104 similarly determines the object distances $D_D$, $D_E$. In the case shown in FIG. 3, however, the light beams 124, 125 emitted from the light emitting elements 114, 115 at the ends are not reflected due to the absence of objects in the emitting directions and are not received by the light receiving element 140. Consequently the photocurrents $I_1$, $I_2$ are not generated by reflected light and the distance is considered as infinite.

The CPU determines the moving amount of the lens for guiding the focusing lens to the in-focus position, for example according to the shortest one of thus determined object distances $D_A$, $D_B$ and $D_C$.

In addition the CPU determines the areas of the object according to whether the light beams from the light emitting elements 111–115 are reflected by the objects and received by the light receiving element 140. The camera of the present embodiment is assumed to be equipped with a photographing lens of which focal length is adjustable within a range from 35 to 70 mm.

Figure 3:
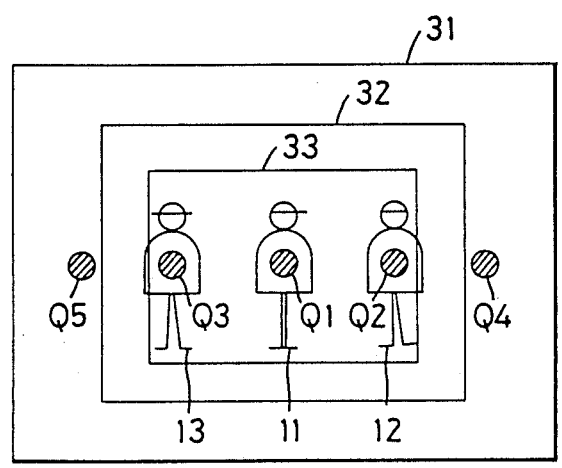
FIGS. 3 to 5 are views showing various positions of the object in the photographing frame.

FIG. 3 shows photographing frames 31, 32, 33 for the same objects, respectively at focal lengths 35, 50 and 70 mm. Points Q1–Q5 indicate the distance measuring points where the light beams from the light emitting elements 111–115 fall on objects when the focal length is adjusted at 35 mm.

The point Q1 is positioned at the center of the photogrpahing frame, while the points Q2, Q3 are positioned slightly inside the photographing frame 33 at the focal length of 70 mm, and the points Q4, Q5 are positioned slightly outside the photographing frame 32 at the focal length 50 mm.

Figure 4:
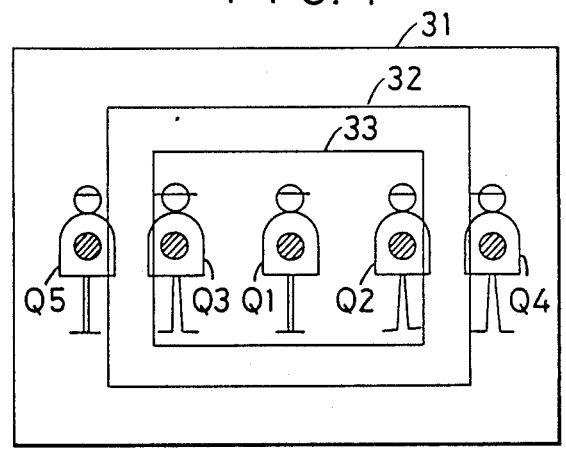
Figure 5:
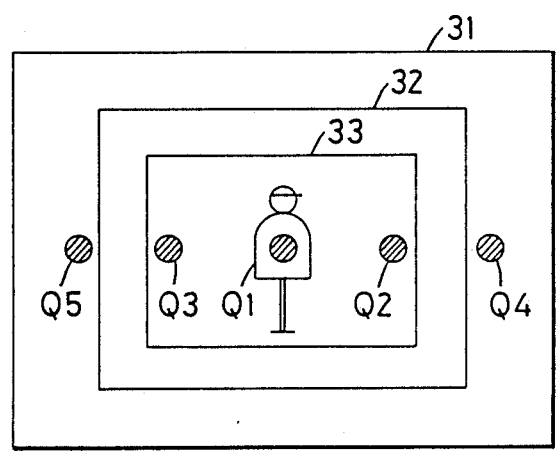

If at least one of the light beams from the light emitting elements 114, 115 at the ends is reflected by an object and the reflected light 124' or 125' is received by the light receiving element 140, there is discriminated the presence of an object at least at one of the points Q4 and Q5 (in both positions in case of FIG. 4). Also in case the light receiving element 140 does not receive the reflected light beams 124', 125' but receives at least one of the reflected light beams 122', 123', there is discriminated the absence of objects at the points Q4, Q5 and the presence of an object at least at one of the points Q2, Q3, as shown in FIG. 3. Also in case the reflected light beams 122'-125' are not received but only the reflected light beam 121' is received, there is discriminated the presence of an object only at the central point Q1 as shown in FIG. 5.

Based on the result of such discrimination, the CPU controls the focal length of the photographing lens as will be explained later.

Figure 6:
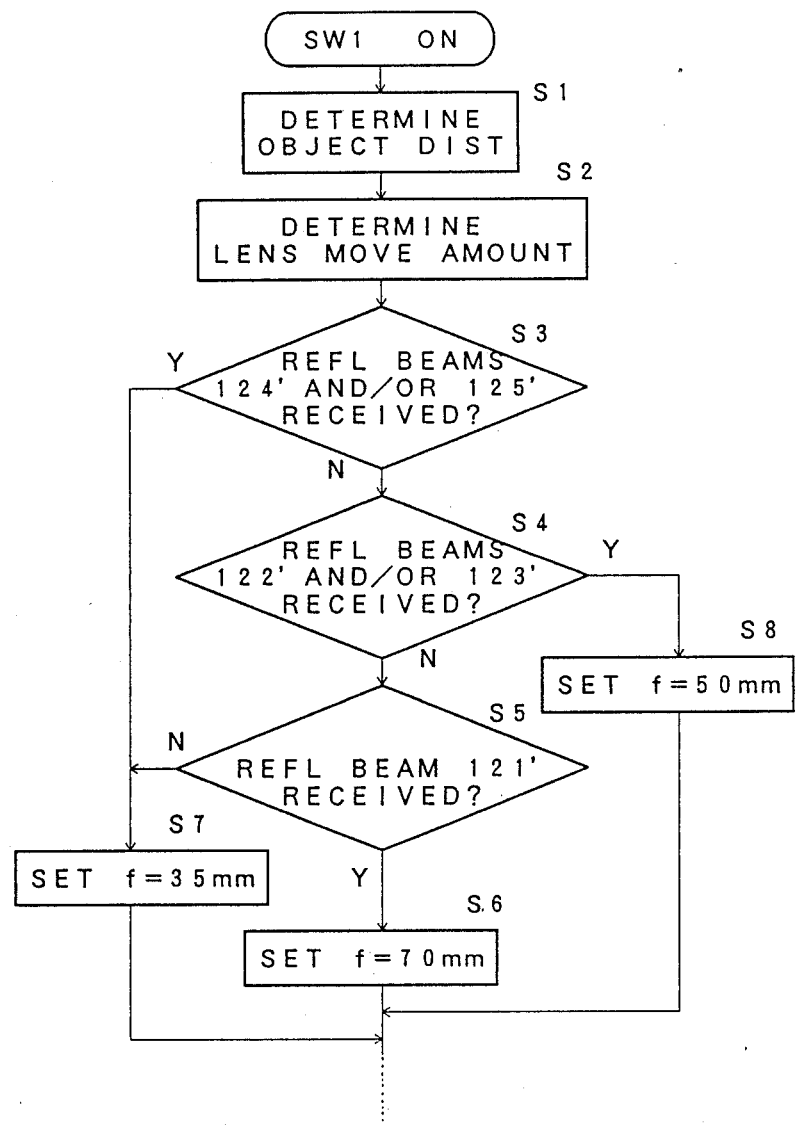
FIGS. 6 and 7 are flow charts showing control sequences.

Now reference is made to a flow chart shown in FIG. 6, for explaining the control sequence of the CPU.

A program corresponding to the flow chart is executed when the switch SW1, linked with the shutter release button, is closed while the aforementioned switch SW3 is closed. At first a step S1 determines the object distances. More specifically, voltage signals obtained from the photocurrents I1, I2 of the light receiving element 140 and processed by the signal processing circuits 141, 142 corresponding to the reflected light beams 121', 125' are converted into digital signals by the A/D converters 102, 103, and are used in the operator 104 for determining the object distances $D_A-D_F$ according to the equation (5). The object distance is not determined if the reflected light beam is not received. Then the sequence proceeds to a step S2 for determining the moving amount of the focusing lens according to the shortest one of the object distances $D_A-D_E$ thus determined.

Then a step S3 discriminates whether the light receiving element 140 has received either of the reflected light beams 124', 125', and, if received, the sequence proceeds to a step S7. In this case, an object exists at least in one of the points Q4, Q5 as shown in FIG. 4, and such objects will be excluded from the photographing frame 32 or 33 if the focal length of the photographing lens is adjusted to 50 or 70 mm. In this case, therefore, the step S7 adjusts the focal length of the photographing lens (planned focal length) to 35 mm. Thus all the objects can be accommodated in the frame 31.

If the discrimination in the step S3 turns out negative, the sequence proceeds to a step S4 for discriminating whether at least one of the reflected light beams 122', 123' has been received by the light receiving element 140, and, if received, a step S8 adjusts the focal length at 50 mm. In this case an object does not exists at the points Q4, Q5 (see FIG. 3) but at least one of the points Q2, Q3, so that object overflows the frame 33 at the focal length of 70 mm, but becomes too small in the frame 1 at the focal length of 35 mm. Consequently, the focal length of 50 mm is selected for maintaining the frame 32 in which the objects do not overflow nor become too small.

On the other hand, if the discrimination in the step S4 turns out negative, a step S5 discriminates whether the reflected light beam 121' has been received by the light receiving element 140. If the result is negative, indicating that no reflected light beam has been received, the object is discriminated as a landscape and a step S7 adjusts the focal length at 35 mm.

If the discrimination in the step S5 turns out affirmative, a step S6 adjusts the focal length at 70 mm. Since the object exists only at the point Q1 in this case, no overflow of the object from the frame occurs at the focal length of 70 mm.

Then the CPU sends the zooming instruction signal from the output port 101 to the zooming motor drive circuit 134, thereby driving the first lens group L1 and the second lens group L2 by means of the motor 135 and adjusting the photographing lens to the selected focal length. Then, in response to the closing of the switch SW2, the CPU sends the focusing instruction signal from the output port 101 to the focusing motor drive circuit 130, thereby guiding the focusing lens to the infocus position. The CPU effects the photographing operation, by activating the shutter and the diaphragm.

In the following the will be explained the control sequence when SW3 is closed while the constant magnification photographing mode is selected by the switch SW4, with reference to a flow chart shown in FIG. 7, in which equivalent steps to those in FIG. 6 are represented by the symbols.

Figure 8:
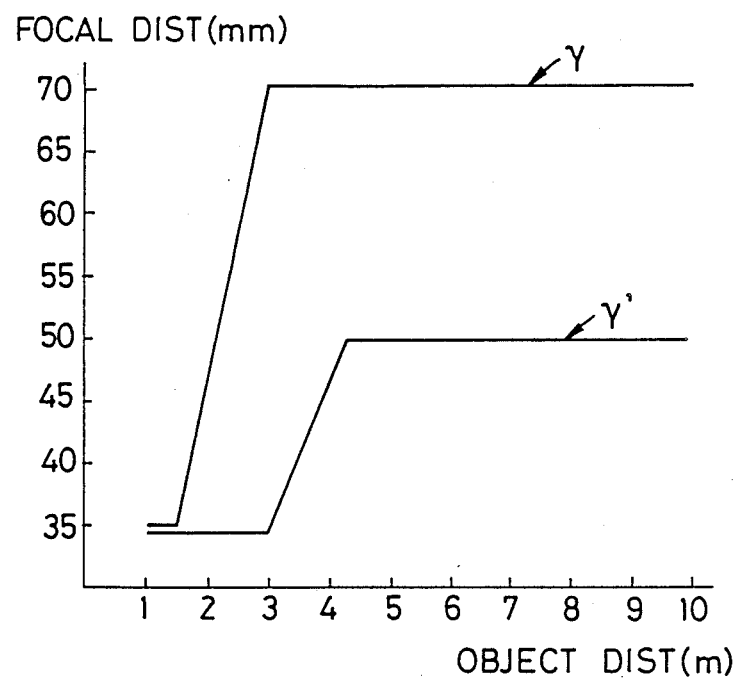
FIG. 8 is a chart showing two different relationships between the distance of the object and the focal length.

The memory of the CPU stores, in advance, two relationships λ, λ' between the object distance and the focal length, in the form of a magnification table. FIG. 8 illustrates these relationships as line charts. In a table based on the relationship λ, the focal length is maintained at 35 mm if the object distance is equal to or shorter than 1.5 m. In a range of object distance from 1.5 to 3 m, the ratio of the focal length to the object distance, or the photographing magnification, is maintained constant within a range of focal length from 35 to 70 mm, and the focal length is maintained at 70 mm if the object distance is equal to or longer than 3 m. In a table based on the relationship λ', the focal length is maintained at 35 mm when the object distance is equal to or shorter than 3 m. In an object distance constant in a range of focal length from 35 to 50 mm, and the focal length is maintained at 50 mm when the object distance is equal to or longer than 4.2 m.

Figure 7:
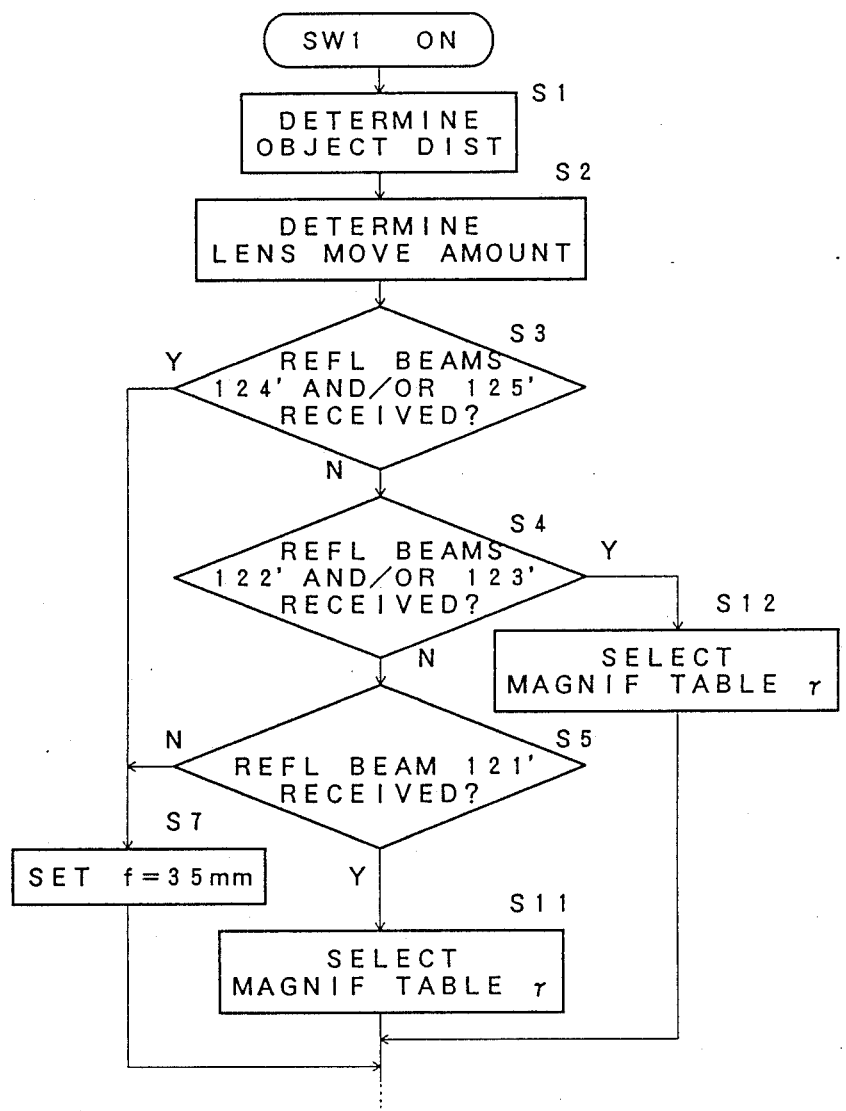

Referring to FIG. 7, if the discrimination in the step S4 turns out affirmative, namely if objects are absent at the points Q4, Q5 but present at least at one of the points Q2, Q3 shown in FIG. 3 (case of objects present in the intermediate area), the magnification table based on γ', and selecting a focal length corresponding to the object distance used for determining the moving amount of the focusing lens. Thus photographing with constant magnification is possible without overflowing of an object from the frame, for an object distance from 3 to 4.2 meters, even when the object consists of plural persons as shown in FIG. 3.

If the discrimination in the step S5 turns out affirmative, indicating that the object exists only at the point Q1, the sequence proceeds to a step S11 for selecting the magnification table based on λ. as shown in FIG. 8, and selecting a focal length corresponding to the object distance. In this manner there is enabled photographing with constant magnification within an object distance range from 1.5 to 3 meters, in which, if the object is a single person as shown in FIG. 5, the upper body of the object is photographed with a constant size regardless of the object distance.

The foregoing description has been limited to a zooming camera with a variable focal length range from 35 to 70 mm, but the present invention is applicable also to cameras in which the focal length can be made shorter than 35 mm or longer than 70 mm.

Also in the foregoing embodiment five distance measuring points are provided in the photographing frame to effect discriminations in the central, intermediate and peripheral areas, and the focal length of the photographing lens is selected at 35, 50 or 70 mm according to the positions of objects in these areas, but there may be employed a larger number of distance measuring points. In such case it is also possible to divide the photographing frame into a larger number of areas and select one of four or more focal lengths according to the position of the objects in said areas.

Also in the foregoing embodiment the distance measuring points are arranged along the lateral direction of the frame for selecting the focal length with respect to the areas of the frame present along the lateral direction, but it is also possible to form such in the vertical direction and to effect similar control in the vertical direction. It is furthermore possible to combine the lateral and vertical directions, thereby effecting two-dimensional control.

In the foregoing embodiment, the moving amount of the focusing lens is determined according to the shortest one of plural calculated object distances, but it is also possible to determine the moving amount, for example, according to the average of all the object distances.

Also in the foregoing embodiment, the positions of the objects ar identified from the data from the distance measuring circuit for focusing. but there may be provided exclusive detecting means for solely detecting whether the objects are present in certain areas of the frame. Furthermore the foregoing description has been limited to a camera with active distance measurement in which the object distance is measured by irradiating the object with infrared light and detecting the reflected light, but the present invention is likewise applicable to cameras with other distance measuring methods, such as passive distance measurement.

What is claimed is:

1. A zooming control device for a camera having a zoom lens system, comprising:
   distance measuring means for measuring object distances corresponding to a plurality of positions in an object area;
   discriminating means for discriminating, on the basis of the measured object distances, whether an image of an object will be within a photographing frame for a given focal length of said zoom lens system; and
   means for adjusting focal length of said zoom lens system in accordance with said discriminating so that the image will be within the photographing frame.

2. A zooming control device according to claim 1 further comprising means for selecting the focal length of said zoom lens system in relation to measured object distances so that the ratio of focal length to object distance is constant within a range of object distances.

3. A zooming control device according to claim 2, wherein said distance measuring means determines the presence of an object in a central portion of said object area, and a surrounding portion around said central portion.

4. A zooming control device according to claim 3 further comprising memory means provided with plural data tables including a high magnification table for a relatively high ratio of focal length to object distance and a low magnification table for a relatively low ratio of focal length to object distance, and wherein said adjusting means adjusts the focal length of said zoom lens system according to focal length selected from said high magnification table when said distance measuring means determines that an object is present only in said central portion, and adjusts the focal length of said zoom lens system to a focal length selected from said low magnification table when said distance measuring means determines that an object is present in said surrounding portion.

5. A zooming control device for a camera having a zoom lens system, comprising:
   means for presetting information relative to photographing magnification;
   means for detecting whether an object is present at different positions in an object area to be photographed;
   means responsive to said detecting means for discriminating whether an image of an object present in said area is within a photographing frame if photographing is effected with a magnification according to said preset information; and
   means for effecting a photographing operation with a magnification according to said preset information if the discriminating means discriminates that said image is within said photographing frame with the magnification according to said preset information, but with a different magnification so that an image of said object is within the photographing frame if the discriminating means discriminates that an image of said object is not within the photographing frame with the magnification according to the preset information.

6. A zooming control device according to claim 5, wherein said detecting means comprises means for producing distance information corresponding to distances to object positions in said area, and wherein said presetting means is adapted to preset information with respect to photographing magnification in such a manner that the ratio between the focal length of said zoom lens system and object distance remains substantially constant within a range of object distances.

7. A photographic control device, comprising:
   means for determining the presence of an object at a plurality of positions in an object area;
   discriminating means responsive to said determining means for discriminating whether an image of the object will be within a photographic frame for a given photographic magnification; and
   means responsive to said discriminating means for selecting a magnification so that the image is within said photographic frame.

8. A photographic control device according to claim 7, wherein said determining means comprises means for measuring object distances corresponding to said positions in said object area.

* * * * *